FIG. I

United States Patent Office 3,386,886
Patented June 4, 1968

3,386,886
NUCLEAR REACTOR REACTIVITY CONTROL BY BUBBLING GAS THROUGH MODERATOR LIQUID
Angus Charles Whittier, Peterborough, Ontario, Canada, assignor to Canadian General Electric Company Limited, Toronto, Ontario, Canada, a corporation of Canada
Filed Aug. 26, 1966, Ser. No. 575,434
3 Claims. (Cl. 176—42)

ABSTRACT OF THE DISCLOSURE

To vary the effective neutron capture cross section of the moderating liquid in a heavy water moderated reactor, helium gas is bubbled through the moderator at a controlled rate, the level of moderator being maintained constant in the reactor to avoid diminution of the bubbling effect.

---

This invention relates to a liquid moderated nuclear reactor in which nuclear reactivity is controlled by means of the density of the liquid moderator. More specifically, the density of the liquid moderator is controlled by a gas dispersed throughout the body of moderator in the form of small gas bubbles or voids.

In a liquid moderated reactor, one method of control of reactivity is by variation of the moderator level in the core as described in British patent specification No. 792,-972, published Apr. 9, 1958, in which the reactor shuts down upon the expulsion of moderator from the core.

The so-called boiling nuclear reactor, or boiling coolant nuclear reactor is one in which at least a portion of the coolant is converted into a vapour state within the reactor by boiling action. The coolant may or may not also serve as a moderator. Another version of the boiling reactor contains a separate liquid moderator which serves as the boiling medium. Boiling of the liquid moderator results in the formation of bubbles or voids in the liquid, which voids tend to reduce the density of the body of moderator and thereby diminish the nuclear activity in the reactor. Hence the effect of the boiling liquid is to limit the power output of the reactor. It is evident that in such a reactor, the variations in density of the moderator is directly related to this boiling action or to the temperatures and pressures developed inside the reactor. The voids due to boiling tend to limit the power output of the reactor, but some other means such as control rods must also be provided in order to fully control nuclear reactivity.

This invention relates to a nuclear reactor which is moderated by means of a body of liquid moderator and in which nuclear reactivity is controlled throughout the normal operating range of the reactor by varying the effective density of the body of moderator. A gas is dispersed in the form of bubbles through the liquid moderator which is in neutron moderating relation with nuclear reactivity in the nuclear chain reacting assembly in the reactor. In effect, the dispersion of gas bubbles alters the density of the body of moderator. The gas is bubbled through the moderator under controlled conditions, through which control of the reactor is effected.

Thus the present invention provides a method of operating a nuclear reactor of the rodded heterogeneous type having a moderating liquid such as $D_2O$ contained in a calandria having a reactive core mounted therein, comprising the steps of bubbling a gaseous fluid of low neutron capture cross-section upwardly through the moderating liquid, and controlling the volume of fluidized moderator to provide controlled variation in the moderating effect thereof, whereby control of the reactivity may be effected and the rate of conversion of nuclear fuel to plutonium may be simultaneously enhanced.

Figure 1:
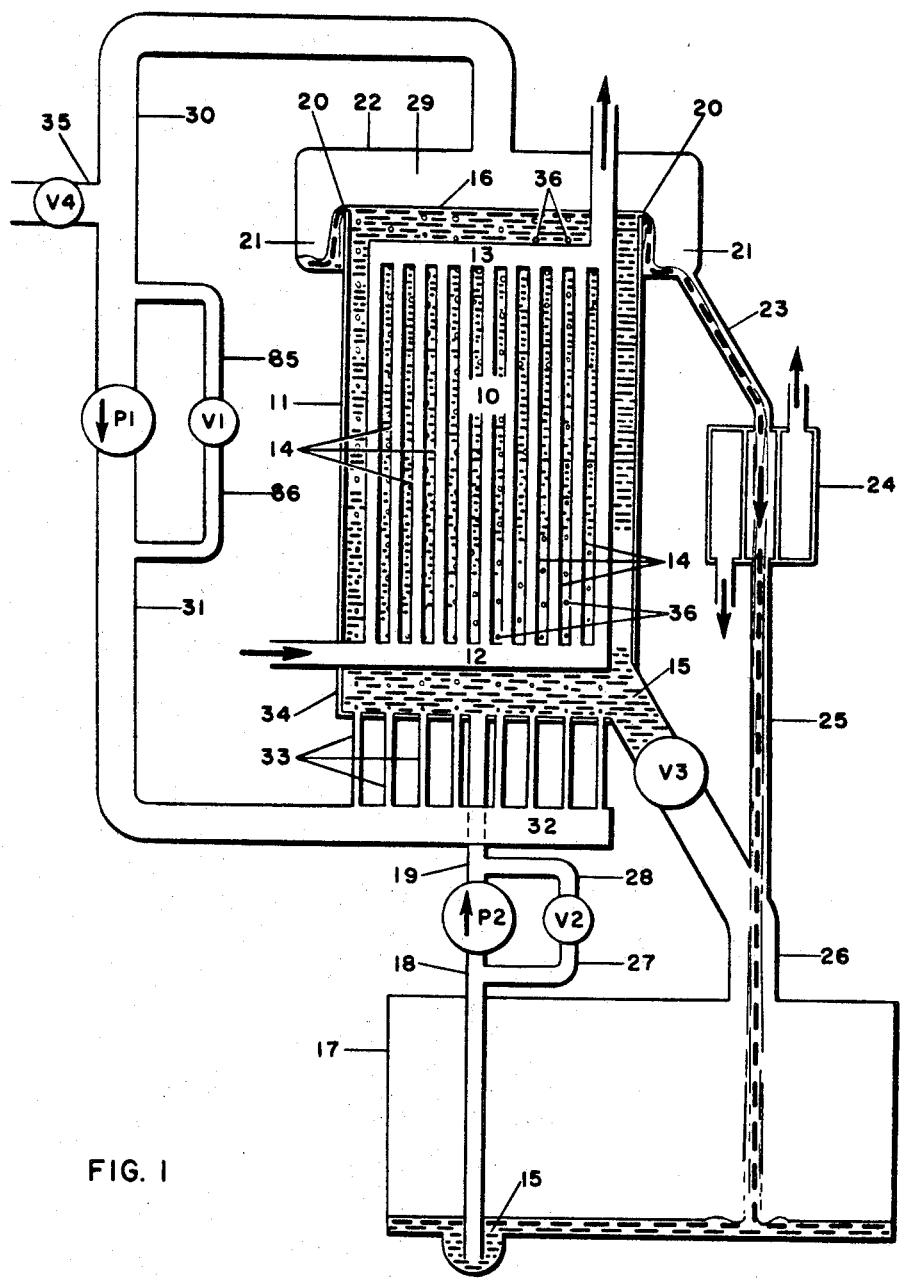
FIGURE 1 is a diagram of a liquid moderated nuclear reactor embodying the invention.

In the nuclear reactor illustrated in FIGURE 1, a nuclear chain reacting assembly or core 10 is contained inside a closed vessel 11 generally referred to as a calandria. Core 10 comprises a plurality of spaced tubes 14; in this particular instance they are shown standing upright in the calandria and are interconnected at their lower and upper ends respectively for parallel fluid conveyance by means of manifolds 12 and 13. However, the invention is equally applicable to reactors wherein the tubes are located in other than an upright position. Generally, the reactor core includes a very large number of these tubes arranged in precise, spaced, geometrical relation but for the sake of drawing clarity only a few tubes are shown in FIGURE 1. Since this invention is not concerned directly with core design and it is not limited to a specific type of core structure, the many factors involved in the design of a core will not be considered. Each tube 14 is adapted to receive a plurality of nuclear fuel elements which are positioned in the tube in such a way that a fluid coolant is free to circulate around the fuel elements as it flows through the tubes. Coolant may enter the tubes via manifold 12 and after absorbing heat from the fuel elements pass into manifold 13 from which it flows to a heat exchanger which has not been shown in the drawings. Calandria 11 contains a pool 15 of liquid moderator which surrounds tubes 14. Light water and heavy water are both utilized as moderators but generally heavy water is preferred. Although heavy water is not the most effective material known for slowing down fast neutrons to thermal energy levels, it absorbs fewer neutrons in the process.

During operation of the reactor, the calandria is filled with the liquid moderator to a level 16 and this level is maintained by pump $P_2$ which continually pumps moderator from a dump tank 17 into the calandria via conduits 18 and 19. Excess moderator spills over the weir 20 defined by the upper edge of the calandria into a trough 21 which surrounds the upper end of the calandria and includes also a top 22 for the calandria. The moderator collected in the trough is returned to the dump tank by way of conduit 23, heat exchanger 24, conduits 25 and 26. Hence there is a continual flow of moderator through core 10, and the heat absorbed during its passage through the core is removed in heat exchanger 24, thereby returning relatively cool moderator to the dump tank for re-use. A valve $V_2$ which bypasses pump $P_2$ via condits 27 and 28 can be used to control the rate of moderator flow from the dump tank to the calandria during reactor operation at reduced power levels or to control draining of the calandria. A normally closed valve $V_3$ in an enlarged conduit 26 leading directly from the bottom of the calandria to the dump tank is adapted to be opened rapidly to dump the moderator in the calandria into the tank in the event that it becomes necessary to shut down the reactor in a hurry. Under normal reactor operating conditions, the dump tank contains a relatively small quantity of the liquid moderator.

Through the practice of this invention, the nuclear activity taking place in core 10 is controlled by means of the density of the pool of liquid moderator 15 in the calandria. The effect of a change in moderator density depends primarily upon the ratio of moderator atoms to fuel atoms in the core. As this ratio changes from say a low value to a high value, the reactivity first increases, then reaches a peak, and finally decreases. On the low ratio side of the peak the reactor is undermoderated and on the high ratio side it is overmoderated. There is a measure of safety in having the fuel spacing sufficiently great that the reactor is overmoderated when no bubbling occurs; this is due to the fact that if the reactor was being operated at the peak of the moderator-fuel ratio versus reactivity curve, and bubbling was accidentally cut off, the reactivity of the reactor would automatically decrease thus shutting down the reactor. This way of operating a reactor may not be as economical as in the case where the spacing results in maximum reactivity with no bubbling, but it is a possible way to operate the reactor. There are other reasons why spacing for overmoderation might be desirable, but the actual design would depend on the economics of the particular situation.

In the so-called boiling reactor, boiling or vapourization of moderator produces voids in the moderator, which voids in effect reduce the density of the liquid. However, in a boiling reactor, the volume of voids increases with increase of boiling and this serves as an upper limit of the nuclear reactivity rather than full control of the reactor throughout its normal operating range. It is contemplated through the present invention to generate voids in a liquid moderator by means other than boiling of the moderator, that is, by bubbling a gas such as, for example, helium through the moderator. In a system such as the one illustrated in FIGURE 1 and using helium, the bubbles grow larger as they rise through the pool of moderator because the pressure on them due to the head of moderator decreases. Therefore, the effective density of the moderator will be lower at the top of calandria 11 than at the bottom thereof; this variation in bubble sizes will tend to distort the power production pattern from the desirable sine wave distribution to a pattern which has a maximum value some distance from the midsection of the reactor. Hence the ratio of the average to maximum power output of the reactor might be reduced. It is advantageous to have the size of the bubbles remain substantially constant as they rise through the moderator. To this end, a soluble gas or a mixture of gases could be employed, for example, a mixture of dry $D_2O$, steam and helium. As the bubbles rose through the moderator, the steam would dissolve in the moderator whereby bubble growth could be controlled. A very desirable situation would be one in which the bubbles are largest at the center of the reactor; this would cause an increase in the ratio of average to maximum power along each fuel channel. Another example of a suitable gas is dry steam of the liquid moderator.

Referring again to FIGURE 1 there is shown a closed system for circulating a gas through liquid moderator 15, which system comprises in counterclockwise order calandria 11, gas space 29 above the moderator and defined by trough 21 and calandria cover 22, conduit 30 secured to cover 22 in communication with space 29, pump $P_1$, conduit 31, manifold 32 and a plurality of relatively small passages providing communication from the manifold to the calandria. These passages are shown in FIGURE 1 as tubes 33 secured at their lower ends to the manifold and at their upper ends to the bottom wall 34 of the calandria. A bypass circuit including conduits 85, 86, and valve $V_1$ is connected across pump $P_1$. Gas from an external source (not shown) may be initially introduced into the system and added as make-up by way of the shut-off valve $V_4$ and conduit 35.

Figure 2:
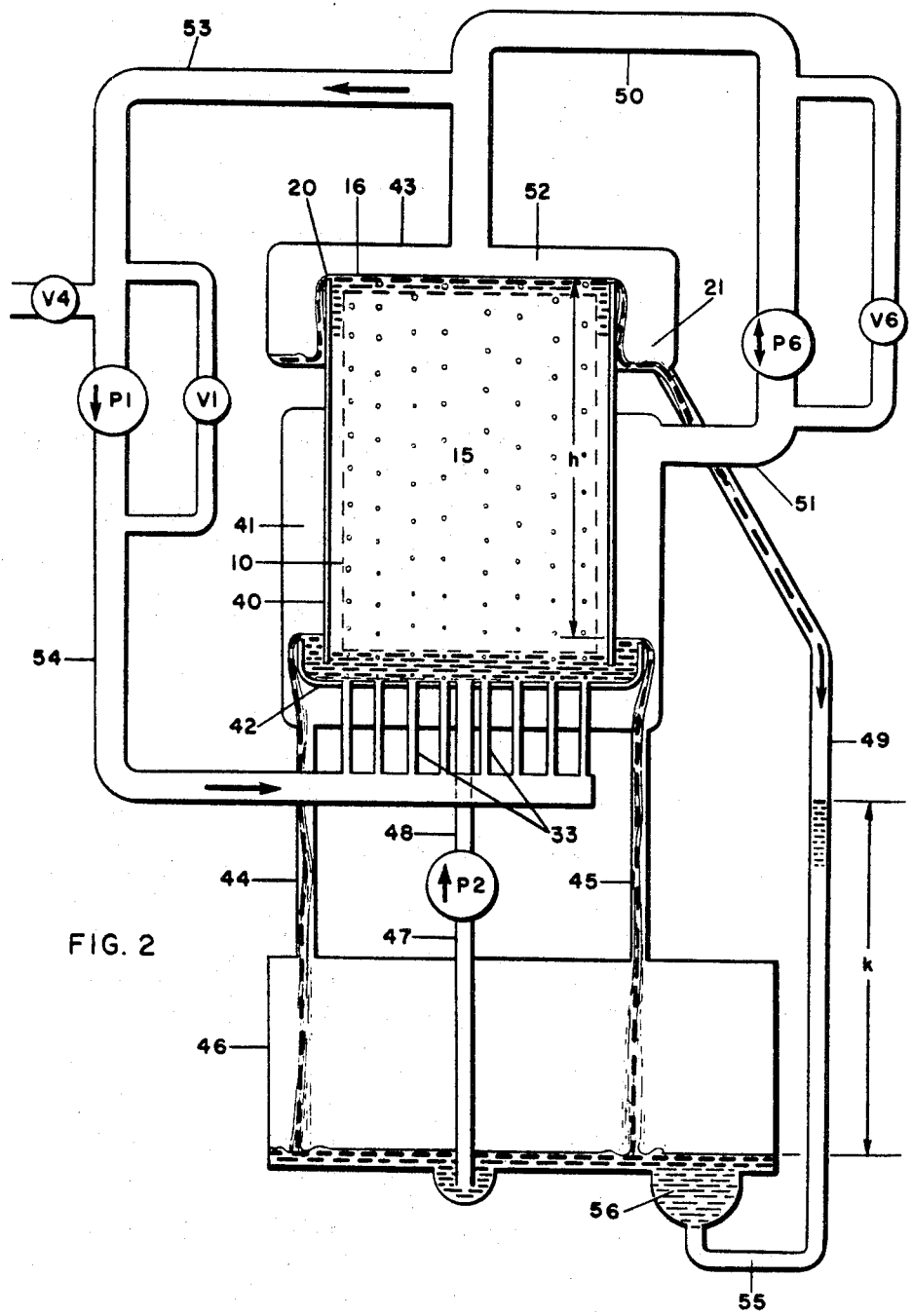
FIGURE 2 is a similar diagram of another embodiment of the invention.

Pump $P_1$ forces the gas through pasages 33 under sufficient pressure to cause it to bubble upwardly through moderator 15 into space 29 from which it is drawn off through the suction line 30 leading back to the pump. The number, location and spacing of passages 33 are such that the bubbles or voids indicated generally at 36 are dispersed throughout the moderator which surrounds tubes 14 of core 10. Each passage 33 is small enough that the gas in it blocks the flow of liquid moderator through the passage and that bubbles are formed as the gas emerges from the passage. FIGURES 1 and 2 show passages 33 as tubes which are enlarged greatly and restricted severely in number for the sake of drawing clarity. In effect, the presence of gas bubbles or voids in the pool of moderator alters its density, that is, some of the moderator in the calandria is displaced by the gas bubbles. Hence by varying the volume of the gas bubbles in the moderator according to a controlled program, it is possible to exercise control over the reactor. Control over the gas flow may be effected through control of pump $P_1$ supplemented by control valve $V_1$.

It has already been pointed out that the bubbles increase in size as they rise, due to static pressure, which in effect causes the moderator density to decrease with height. This density differential depends on the height of the column of moderator, and the pressure exerted by the gas on the column of moderator. That is, the density differential increases with the height of the column, and decreases with increase of pressure. It is possible to reduce substantially the density differential by the application of substantial pressure to the system, i.e., pressurization of the system.

Figure 3:
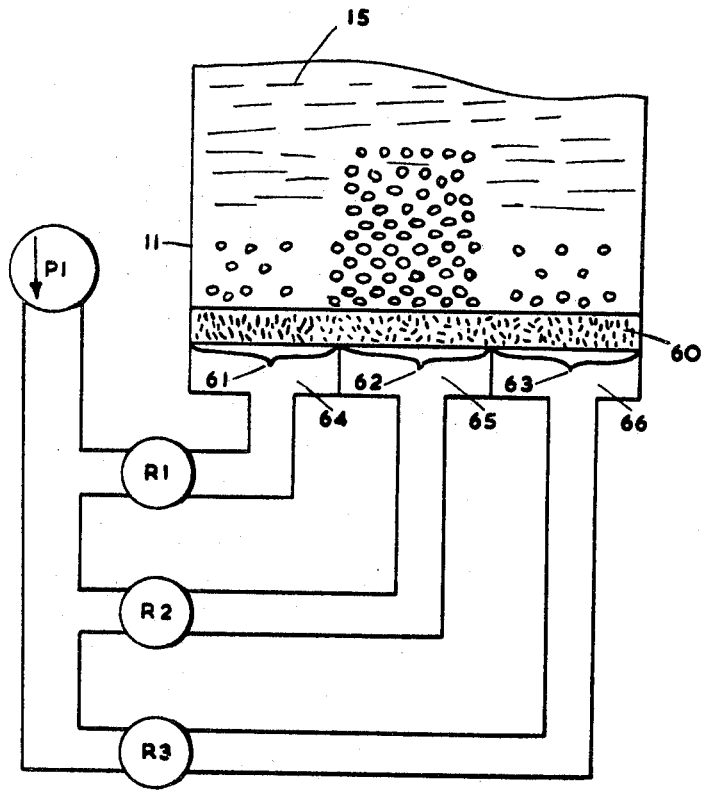
FIGURE 3 is a diagram of a portion of a reactor illustrating another feature of the invention.

There are a number of ways to introduce bubbles into the moderator. A preferred arrangement is shown in FIGURE 3 and comprises a perforated or porous floor 60 through which a gas will readily pass, for example, a floor composed of sintered stainless steel. The underside of this floor may be divided into a number of regions by means of separate gas compartments and the gas flow to each compartment separately controlled whereby the amount of bubbling at one region can be made to differ from the amount of bubling at other regions. In FIGURE 3, three such regions 61, 62 and 63 are illustrated, region 61 being defined by the top side of compartment 64, region 62 by the top side of compartment 65, and region 63 by the top side of compartment 66. Pump $P_1$ pumps the gas into compartments 64, 65 and 66 through regulators R1, R2 and R3 respectively, which regulators are individually adjustable for control of the gas supplied to each compartment and thereby the bubbling at each region. It is often desirable to change the reactivity of part of a reactor core independently of the rest of the core. For instance in a large power reactor, a phenomenon commonly known as xenon oscillation can sometimes arise. This oscillation causes the power density to fluctuate from region to region in the core and can cause embarrassing fluctuations in power output. A suitable way to counteract these oscillations is to change the reactivity in various parts of the core by bubbling gas through the different parts at different rates, that is, by producing moderator density changes nonuniformly through the core in a controlled manner. There are other reasons for wanting a bubbling system that can be varied independently in different core regions.

Another reactor structure to which the invention can be applied is shown in FIGURE 2. In this arrangement a modified calandria 40 contains reactor core 10 (dotted outline) and liquid moderator 15. The calandria, trough 21 and cover 43 define a first chamber 52 separated from a second chamber 41 known as the moderate dump space by a circumferential dump ring 42 which provides a limited access from the first chamber to the second chamber. Moderator 15 filling the lower portion of the first chamber 52 separates the two chambers and a gas such as helium is confined in the second chamber and the upper part of the first chamber. The gas in the two chambers is maintained at a pressure differential by a pressure differential pump $P_6$ in ducts 50, 51 and a regulating valve $V_6$ by-passing the pump such that under normal operating conditions only a small amount of liquid moderator is permitted to flow from the first chamber through the dump ring and into the second chamber. Any liquid moderator in the second chamber 41 is passed via conduits 44 and 45 through a heat exchanger and purifier (not shown) into dump tank 46 from which it is pumped back into the calandria through conduits 47 and 48 by means of pump $P_2$. Excess moderator pumped into the calandria flows over weir 20 into trough 21 and from there back to the dump tank through conduit 49 (which also includes a heat exchanger and purifier not shown), trap 55 and sump 56. Valve V across differential pump P serves also a dump valve which in response to an abnormal increase in nuclear reactivity opens to equalize the gas pressure in the two chambers and thereby causing the expulsion of the moderator from the first chamber through the dump ring into the second chamber and finally into the dump tank. Since the "slowing down" action of the moderator is a necessary pre-requisite for sustained fission, the reactor shuts down upon the expulsion of the moderator from the first chamber. Canadian Patent 593,743, dated Mar. 1, 1960, by M. J. McNelly, describes a reactor structure of the aforementioned type where the circumferential dump ring is replaced by a plurality of dump ports in the calandria floor. The McNelly reactor provides for a substantial increase of rate of moderator flow from the first chamber to the second chamber during the moderator-dumping interval. However, no distinction need be made between the two in so far as this invention is concerned.

As in the FIGURE 1 embodiment, the closed system for circulating the gas through the liquid moderator includes pump $P_1$ which draws the gas off from one side of the body of moderator through conduit 53 and causes it to bubble through the body of moderator from the other side thereof via conduit 54 and passages 33. Control of nuclear reactivity is exercised through control of pump $P_1$ supplemented by control of bypass valve $V_1$. The porous calandria floor or this type of floor divided into regions as described with reference to FIGURE 3 may also be employed in the FIGURE 2 system.

It is to be noted with reference to FIGURE 2 that the dump tank is in direct communication with the second chamber 41 through conduits 44 and 45, and that this tank is also in communication with the upper part of the first chamber 52 through conduit 49. The loop 55 on the lower end of conduit 49, known as a liquid trap, functions to allow liquid moderator to flow from trough 21 to the dump tank and simultaneously to restrict severely the flow of gas from the second chamber to the first chamber. This trap is necessary because the gas pressure in the second chamber is substantially greater than the gas pressure in the first chamber in view of the head of liquid moderator $h$. It is possible to dispense with trap 55 by running conduit 49 directly into the dump tank through the top thereof such that the lower end of conduit 49 terminates in sump 56 below the moderator level as shown in connection with conduit 47.

If the depth of liquid in the calandria is $h$ inches, there will be a standing head of liquid $k$ equal to $h$ in conduit 49 above the level of the liquid in the dump tank. As long as there is liquid in the dump tank, the gas therein will be isolated from the gas in trough 21 by the liquid in conduit 49. Head $h$ of moderator in the calandria produces a pressure difference between tank 46 and trough 21 but at the same time allows moderator to flow from 21 to 46. A gravity return system such as this must be laid out such that the upper level of the column of liquid K is always a suitable distance below the floor of trough 21.

A comparison of prior methods with the bubble control methods will now be made.

*Control rods*

(1) Control rod mechanisms have many intricate and costly moving parts. Bubbling can be adjusted by relatively simple means such as throttle valves.

(2) A control rod causes a local power depression. Further if the rod is only partially inserted into the reactor, this depression extends only along the length of the rod, so that the power in neighboring fuel sites is awkwardly distributed. This situation generally causes a reduction in the maximum available power, and is undesirable. Bubbling can be localized or distributed and it will extend to the full height of the moderated core. The essence of the method is that reactivity changes can be made with as much or as little power distortion as is desired, and it gives great flexibility of control.

(3) Control rods absorb neutrons uselessly. Bubble control takes advantage of the fact that a reduction in effective moderator density results in increased neutron capture in $U^{238}$ which results in the eventual production of plutonium, a fissile material. In effect, the neutrons that are unwanted now are stored away and are used later on when the plutonium fissions. *Thus the fuel lifetime is increased and fuel costs decreased.* Of course when moderator density is decreased, there is also an increase in neutron leakage; however, in a typical heavy water moderated power reactor the increase in the number of neutrons lost by leakage is about the same as or less than the increase in the number producing plutonium.

(4) Control rods usually require some sort of structure within the reactor to guide them in and out; otherwise they might foul neighboring fuel sites. This guiding structure, usually in the form of guide tubes, absorbs neutrons, and hence is detrimental to the neutron economy; in effect, it causes increased fuel costs. Bubbling does not require any structure inside the reacting assembly.

(5) Control rods often become distorted by radiation and thermal effects, and get stuck in their guide tubes. This cannot happen to bubbles.

(6) The absorbing material in control rods burns out; hence, the rods must be replaced from time to time. This does not apply to bubbling.

*Level control*

(1) A change in moderator level causes a change in the maximum allowable power output of a reactor. For instance if the moderator level is reduced by 25%, the maximum allowable power is reduced 25%; this is generally undesirable. Bubbling changes reactivity without changing the amount of fuel surrounded by moderator, therefore reactivity can be adjusted without the power output being affected.

(2) When the moderator level is reduced to reduce reactivity, the unwanted neutron fraction is lost uselessly by leakage. As explained in (3) under "Control Rods," bubbling conserves about half the unwanted (at the time) neutrons for future use.

(3) In a power reactor, local power distortions can occur for various reasons (e.g. xenon poison oscillations, burned out fuel being replaced by new fuel). Generally, such distortions are undesirable. However, level control cannot counteract these effects. Bubble control, on the other hand, can, if the system has a sufficiently large number of separately adjustable bubble regions in the core, adequately counteract local power fluctuations.

(4) "Power flattening" is a term applied to the increasing of the ratio of average to maximum power density in the reactor. Without power flattening, the peak power density usually occurs at the centre of the reactor; with power flattening the power density tends to be uniform over a large central portion of the reactor. Power flattening cannot be either affected or effected by means of adjusting the moderator level. Bubble control, if there are a sufficient number of independently adjustable bubble regions in the reactor, can produce power flattening, and can vary the amount of flattening as desired. Power flattening, and easy control of the degree of flattening can, potentially, reduce power costs significantly.

Thus it can be seen that the present invention provides effective and practical bubble control which minimizes the absorption of neutrons, to provide optimized conversion of $U^{238}$ to plutonium, thus insuring improved fuel efficiency, while enabling flux distribution to be flattened and the normal xenon load, which is absent upon a restart after prolonged shut-down, being simulated at restart, while at the same time permitting compensation for spatial instability.

What I claim as new and desire to secure by Letters Patent of the United States is:

1. The method of controlling the rate of operation of a heterogeneous type nuclear reactor having a plurality of individual pressurized fuel channels in spaced relation each containing an elongated nuclear fuel assembly, said reactor containing pressurized liquid neutron moderator surrounding said fuel channels and maintained therein by a sustaining gas pressure, including the steps of pressurizing a source of gaseous fluid including water vapour, of low neutron capture cross section, independently of said sustaining gas pressure, bubbling said fluid upwardly through the moderating fluid to control the effective density of said liquid moderator and to compensate at least in part for bubble expansion due to the reduction in static pressure head on moving upwardly through the moderating liquid whereby a desired extent of power reduction is obtained.

2. A heterogeneous type nuclear reactor having a plurality of individual pressurized fuel channels in spaced relation each containing an elongated nuclear fuel assembly, liquid neutron moderator surrounding said fuel channels contained within the calandria of said reactor, gaseous fluid admission means adjacent the bottom of said calandria, moderator overflow sluice means adjacent the top of said calandria to limit the upper level of said moderating liquid, first gas pressurizing means to provide a selected static pressure differential between the bottom and the top of said calandria acting on said moderator liquid to maintain said liquid within the calandria, and second means independent of said first gas pressurizing means to provide pressurizing gaseous fluid at a predetermined rate for upward bubbling through said moderator whereby the power production rate of said reactor is controlled.

3. Apparatus as claimed in claim 2 wherein said gaseous fluid admission means includes zonal flow control means to provide selective control of bubble admission relative to the calandria whereby predetermined power flattening may be obtained.

References Cited

UNITED STATES PATENTS 3,247,072   4/1966   Edlund et al. -------- 176—42

FOREIGN PATENTS 792,972   4/1958   Great Britain.
914,680   1/1963   Great Britain.
916,324   1/1963   Great Britain.

REUBEN EPSTEIN, *Primary Examiner.*